United States Patent [19]

Nishino

[11] Patent Number: 4,787,667
[45] Date of Patent: Nov. 29, 1988

[54] SEAT SLIDE DEVICE

[75] Inventor: Takaichi Nishino, Akishima, Japan

[73] Assignee: Tachi-S Co., Tokyo, Japan

[21] Appl. No.: 61,535

[22] Filed: Jun. 11, 1987

[51] Int. Cl.$^4$ .............................................. B60N 1/02
[52] U.S. Cl. .................... 296/65.1; 248/430; 296/68.1
[58] Field of Search .......................... 296/65 R, 65 A; 297/216; 248/430

[56] References Cited

U.S. PATENT DOCUMENTS

| | | | |
|---|---|---|---|
| 4,204,658 | 5/1980 | Courtois | 248/430 |
| 4,232,895 | 11/1980 | Yoshino | 296/65 R |
| 4,533,107 | 8/1985 | Okazaki | 248/430 |
| 4,556,186 | 12/1985 | Langmesser | 296/65 R |

Primary Examiner—Robert R. Song
Attorney, Agent, or Firm—Oldham & Oldham Co.

[57] ABSTRACT

A seat slide device for adjusting the forward and backward positions of the seat which comprises an upper rail and a lower rail, the upper rail being slidably fitted to the lower rail, in which a seat belt is at its one end secured to one of the upper rail and seat. In one of the upper and lower rails, formed are a plurality of projected pieces, while in the other of those rails, formed are a plurality of incised portions, so that, when an upward pulling force is exerted upon the upper rail via the seat belt, the projected pieces are pressed against the incised portions to bend them and pass therethrough, thereby causing a mutual direct engagement of the upper and lower rails to prevent removal of the upper rail from the lower rail.

11 Claims, 3 Drawing Sheets

FIG.1
FIG.2
FIG.3
FIG.4
FIG.5
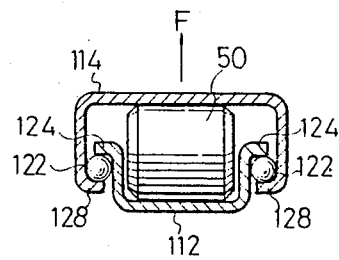
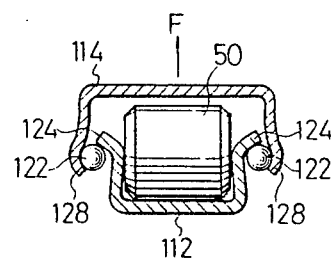
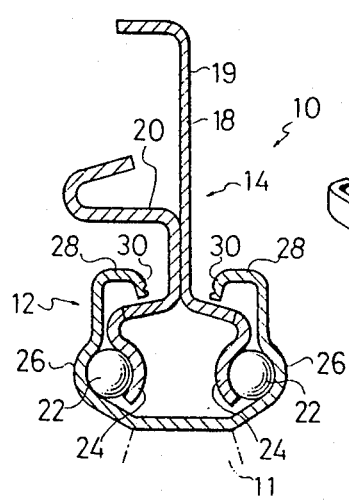
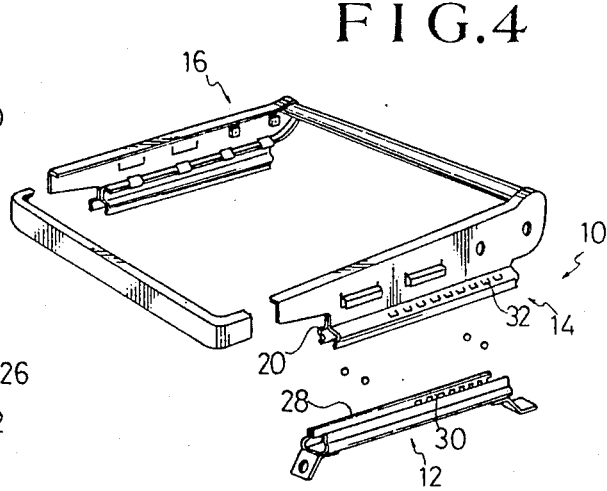
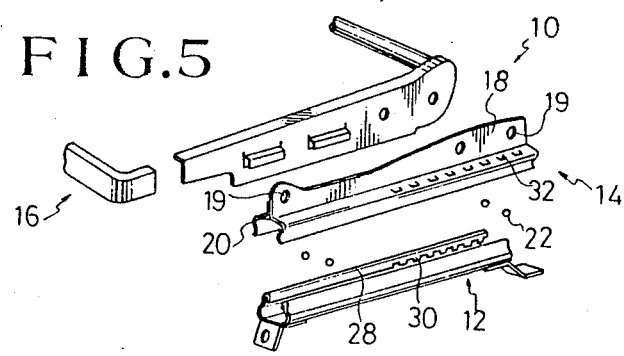

SEAT SLIDE DEVICE

BACKGROUND OF THE INVENTION

1. Field of the Invention

The present invention relates to a seat slide device for an automotive seat, which is adapted to adjust the forward and backward positions of the seat, and more particularly relates to an improvement on a seat slide device comprising upper and lower rails, the upper rail being slidably fitted to the lower one, in which a seat belt is at its one end anchored to the upper rail or a seat frame of the seat, in order that the upper rail is prevented from its removal out of the lower rail.

2. Description of the Prior Art

Most of generally designed seat slide devices are essentially composed of a lower rail to be fixed to the floor of an automobile and an upper rail to be fixed to the bottom surface of a seat, with such an arrangement that the upper rail is fitted to the lower rail in a slidable fashion. In actual use, a pair of thus-constructed slide devices are each provided on the respective lateral sides of a seat.

Referring to FIG. 1 of the accompanying drawings, illusstrated is an example of conventional seat slide device of this kind. In this particular device, a roller (50) is disposed between a lower rail (112) and an upper rail (114), and a steel ball (122) is embraced by both inwardly bent end (128) of the upper rail (114) and outwardly bent end (124) of the lower rail (112). It is, then, understandable that a vertical force is exerted on the roller (50) whereas vertical and transverse forces are exerted on the steel ball (122).

The advantage of such prior art, therefore, is found in no possibility of the upper rail (114) being dislocated vertically or laterally relative to the lower rail (112), allowing the former rail to smoothly slide along the latter rail.

Although not shown in the drawings, a locking structure is in most cases arranged in the foregoing seat slide device, such that a plurality of equidistant projected pieces are formed on the upper rail (114) and a plurality of lock apertures are formed in the lower rail (112) in correspondece with the respective projected pieces, whereby the upper rail (114) can be locked at a desired position on the lower rail (112) when the projected pieces are brought to engagement into the respective lock apertures.

In the above-mentioned device per se, there is no problem in the case of a sudden accident like a collision taking place, with a great load applied thereto. This is particularly the case when a seat belt is not attached around the body of an occupant on the seat. The reason is that, in such accident, the upper and lower rails (114)(112) are given a maximum load only when the occupant is forced backwards to hit his body to the seatback of his seat provided on those rails, at which time, due to such load upon the seat back, an upward pulling force is exerted on the forward point where the forward end portion of the seat is connected to the corresponding portion of the upper rail (114) while at the same time a downward pressing force is exerted on the rearward point where the rearward end portion of the seat is connected to the corresponding portion of the upper rail (114), but the former pulling force (designated by "F" in FIGS. 1 and 2), although tending to remove away the forward end portion of the upper rail (114) from the lower rail (112) in an arrow direction as in FIG. 1, is not so sufficiently great as to remove the upper rail (114). Therefore, the seat slide device is not damaged in such case.

However, in view of the recent circumstances where attaching a seat belt is a mandatory legal requirement for drivers who sit on automotive seats, it is true that every automobile has seat belts mounted therein, and when it is desired to secure one end of the seat belt to the seat frame of the seat or the upper rail of the seat slide device, the aforementioned type of conventional seat slide device is not rigid enough to resist such upward pulling force caused by a collision accident or the like.

In other words, when a seat belt is fixed to the upper rail (114) or the seat frame disposed thereon, in case of a collision accident occuring, the seat belt, which restrains an occupant to the seat, is pulled by the forward inertia force of the occupant, transmitting a maximum pulling force to the seat slide device. In this case, a downward pressing force is exerted on the above-discussed forward point (a point where the forward end portion of the seat is connected with the upper rail (114)), and an upward pulling force is exerted on the above-rearward point (a point where the rearward end portion of the seat is connected with the upper rail (114)). The latter upward pulling force is far greater than the above-mentioned upward pulling force which is caused in the case of nonattaching the seat belt, as a result of which, as shown in FIG. 2, the upper rail (114) is forcibly moved upwards, with the inwardly and outwardly bent ends (128) (129) of the lower rail (112) being deformed, increasing the possibility of the upper rail (114) being removed out of the lower rail (112). If the upper rail (114) is removed from the lower one (112), it will be inevitable that the occupant will be thrown out forwardly together with the seat into a terrible fatality.

To solve this problem, there are some conventional device having a great cross-section of upper rail and lower rail, or the upper and lower rails of thick steel plate to reinforce its rigidity in order to avoid deformation of those rails as well as removal of the upper rail. But, these proposals have been found defective in that such great cross section results in unfavorable big dimensions of the device as it takes up a large space, and further increased weight thereof, and such thick rails also lead to the same result.

SUMMARY OF THE INVENTION

It is a purpose of the present invention to provide an improved seat slide device comprising slidably assembled upper and lower rails, which is effectively reinforced its rigidity without need for a large-sized and weight-increased design thereof, and further prevents removal of the upper rail from the lower rail when a great upward force is applied thereto.

With a view to attaining this purpose, the present invention includes a plurality of projected pieces formed in one of the upper and lower rails such that the projected pieces are arranged in a mutually spaced-apart relationship along the bent ends of such one of the upper and lower rails, and includes a plurality of bendable incised portions formed in the other of the upper and lower rails in likewise spaced-apart manner so that each of the incised portions is located opposite to the respective projected pieces and connected via a connecting portion to the body of such the other of the upper and lower rails. This structure, therefore, allows the incised portions to be easily bended when the projected pieces are caused to press thereagainst in such a manner as if the projected pieces passed through the openings defined by the thus-bended incised portions.

In one aspect of the present invention, there is formed a recessed portion in the end of each of the projected pieces in order that the recessed portion is to receive each end edge of the incised portions when the projected pieces press against the incised portions, bending the same. Accordingly, due to the engagement between the recessed portions of the projected pieces and the end edges of the incised portions, the projected pieces are thereby prevented against their deformation and thus against their removal from the incised portions. Further, such structure adds to reinforcement of the upper and lower rails: The greater pulled is the upper rail, the more firmly engaged together are the the projected peices and incised portions, hence reinforcing more and more the structure of those rails, so sufficiently as to resist a high load applied when a collision accident or the like occurs.

BRIEF DESCRIPTION OF THE DRAWINGS

FIG. 1 is a cross-sectional view of a conventional seat slide device, which shows the state where a upward pulling force (F) is not exerted on the device;

FIG. 2 is a cross-sectional view of the conventional device, which shows the state where the upward pulling force (F) is exerted on the device;

FIG. 3 is a cross-sectional view of a seat slide device in accordance with the present invention;

FIG. 4 is an explosive perspective view of the seat slide device of the present invention which is integrally assembled with a seat frame;

FIG. 5 is an explosive partial perspective view showing the seat slide device which is assembled independently of the seat frame;

DETAILED DESCRIPTION OF PREFERRED EMBODIMENTS OF THE INVENTION

Figure 6:
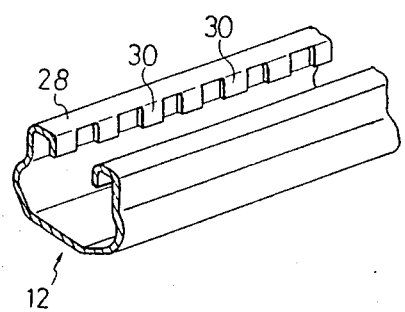
FIG. 6 is a partial perspective view of a lower rail in accordance with the present invention.

Referring to FIG. 3, there is illustrated a seat slide device (10) of the present invention, which is essentially comprised of an lower rail (12) to be fixed to a floor (11) of an automobile and a upper rail (14) to be fixed to the bottom surface of a seat (not shown). The upper rail (14) is slidably fitted to the lower rail (12), and may be assembled integrally with a seat frame (16) (See FIG. 4), or assembled independently of the seat frame (16) (See FIG. 5).

Hereinafter, description will be given, with a particular reference to such independently formed seat as shown in FIGS. 3 and 5.

The upper rail (14) comprises a base plate (18) and a widingly formed plate (20). Both the base plate (18) and widingly formed plate (20) are welded together such that their respective lower portions extend downwardly in a symmetrically distant relation and terminate in inwardly arc-shaped end portions (24). The lower rail (12) is basically formed by bending a unitary steel plate into a substantially U-shaped configuration with an outwardly arc-shaped guide passage (26) formed midway in each of the vertical side walls of thus-formed lower rail (12) and an inwardly bent end portion (28) formed in each of the upper ends of the lower rail (12).

In the present embodiment, as shown in FIGS. 3 and 6, formed are a plurality of equidistant projected pieces (30) on each of the ends of the inwardly bent portions (28) of the lower rail (12) in a longitudinal direction thereof.

The above-described upper and lower rails (14)(12) are assembled together in such a manne that the lower rial (12) encloses the upper rail (14) and steel balls (22) are embraced by both the inwardly arc-shaped end portions (24) of the upper rail (14) and outwardly arc-shaped guide passages (26) of the lower rail (12).

The upper rail (14) is at its base plate (18) fixedly secured to the seat frame (16) by inserting such securing means as a bolt through a hole (19) perforated in the base plate (18).

On the rearward portion of the upper rail (14) or that of the seat frame (16), provided is an anchoring member (not shown) for anchoring one end of a seat belt (not shown).

It is seen that the provision of the steel balls (22) between the upper and lower rails (14)(12) is effective in resisting a transverse force applied to those rails. Therefore, in addition thereto, to provide a resistance against a vertical force applied to the upper and lower rails (14)(12), it may be arranged that at least one roller (not shown) is disposed between the interior of the upper rail (14) and the bottom portion of the lower rail (12). In this way, it is possible to provide both vertical-force and transverse-force resistances in the upper and lower rails (14)(12) so that the upper rail (14) can be smoothly moved slidingly on the lower rail (12) without any vertical and transverse dislocation.

As for the above-mentioned projected pieces (30), they are normally spaced apart from one another at a pitch identical to that of lock holes (not shown) provided in the present seat slide device, which lock holes are a part of locking means for locking the upper and lower rails (14)(12).

In the upper rail (14), adjacent to its inwardly arc-shaped end portions (24), formed are plurality of bendable incised portions (32) such that they are spaced apart from one another at an interval equal to that of the projected pieces (30). In the present embodiment, the bendable incised portions (32) are arranged on the upper rail (14) on both right and left sides thereof in a symmetrical fashion relative to the center of the upper rail (14), as can be understood from FIG. 9.

Thus-arranged incised portions (32) will be bent downwardly with ease when the projected pieces (30) are pressed thereagainst.

Figure 7:
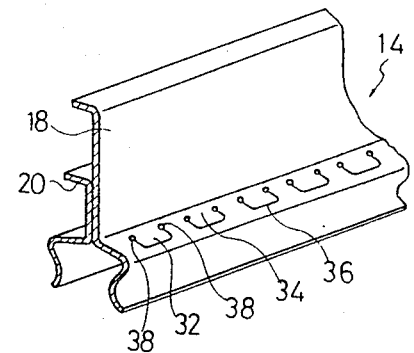
FIG. 7 is a partial perspective view of an upper rail in accordance with the present invention.
Figure 8:
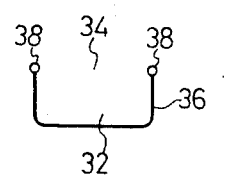
FIG. 8 is an enlarged view of a bendable incised portion formed in the upper rail.

As illustrated in FIG. 7 and 8, each of the incised portions (32) is formed in a rectangular shape, comprising a connecting portion at one side and an incision (36) at other remaining sides. It is preferable that, as shown, a small aperture (38) is formed at each terminal point of the incision (36) since the aperture (38) serves to facilitate the bending of the incised portions (32) and avoid the possibility of the upper rail (14) being cracked, when the projected pieces (30) are pressed against the incised portions (32) to bend the same.

Figure 9:
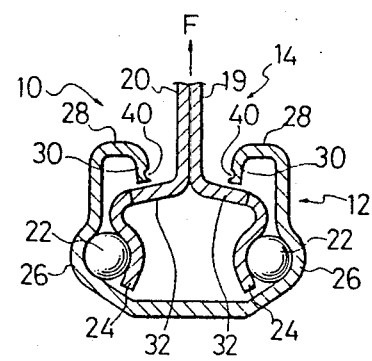
FIG. 9 is a cross-sectional view of a seat slide device in accordance with the present invention, showing the state that an upward pulling force (F) is not exerted on the device.
Figure 10:
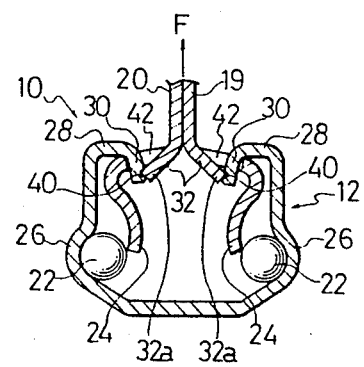
FIG. 10 is a cross-sectional view of the seat slide device in the present invention, showing the state that the upward pulling force (F) is exerted on the device.

With the above-described structure, assuming that an upward pulling force (F) is exerted upon the seat slide device (10) in an arrow direction, as in Fig. 9, in a collision case, then the upper rail (14) is raised by that pulling force (F)), whereupon the incised portions (32) are moved towards and pressed by the projected pieces (30) to be bent down. As the pulling force (F) is kept giving its force to the upper rail (14), the projected pieces (30) tend to be deformed in a direction in which they will be slipped out of the respective incised portions (32). But, as shown in FIG. 10, the pojected pieces (30) are caught by the edges (32a) of the incised portions (32) by the reason of the fact that the edges (32) are then in contact with the projected pieces (30) and, as the pulling force (F) is still applied, the edges (32a) are further brought to a strong abutment against the projected pieces, to thereby prevent their deformation as stated above. It is to be noted that the greater exerted is the pulling force (F) upon the upper rail (14), the more strongly are the edges (32a) of the incised portions (30) brought to abutment against the projected pieces (30). This arrangement is so rigid enough to resist a high pulling force. Accordingly, the upper rail (14) is well prevented against its removal from the lower rail (12) when an extreme upward pulling force is exerted on the upper rail (14).

In this context, it is preferable to form a recess (40) in each of the end portions of the projected pieces (30) so that, each of the edges (32a) is engaged into the recess (40). For, the engagement of the edges (32a) of the incised portions (32) into such recesses (40) permits the projected pieces (30) to be caught more positively and firmly by the incised portions (32).

Figure 11:
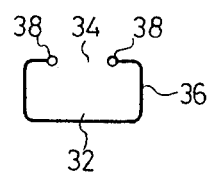
FIG. 11 and FIG. 12 are respectively an enlarged view of a second embodiment, and an enlarged view of a third embodiment, of the bendable incised portion.
Figure 12:
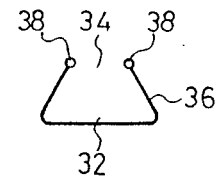
Figure 13:
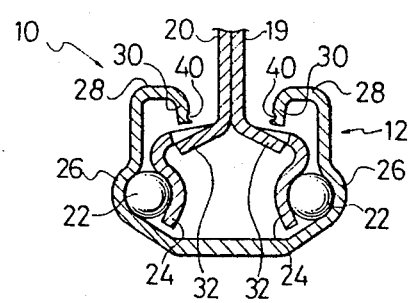
FIG. 13 is a cross-sectional view of a second embodiment of the seat slide device, in which the incised portion has been slightly bent in advance.

The incised portions (32) are not limited to the shape illustrated in FIG. 8, but may be formed in any desired shape in so far as the shape per se is suited for the above-discussed bendability. For example, they may be formed in such manner as in FIG. 11 wherein the incision (36) is formed in almost all of the contour of the incised portion (32). Or, alternatively, they may be formed in a trapezoidal shape, as shown in FIG. 12. Furthermore, the incised portions (32) per se, as depicted in FIG. 13, may be so formed that each of them has been slightly bent downwards, for the purpose of enabling rapid and positive engagement between the incised portions (32) and projected pieces (30), and assuring such engagement even when the upward pulling force (F) is applied at an oblique angle towards the seat slide device (10).

Figure 14:
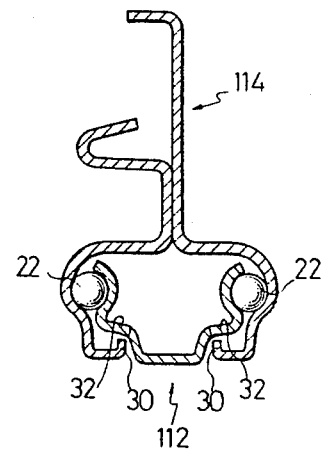
FIG. 14 is a cross-sectional view of a third embodiment of the seat slide device constructed differently from the above-mentioned embodiments.

While, in the embodiments that have been described before, the projected pieces (30) and incised portions (32) are respectively formed in the lower and upper rails (12), it may, of course, be arranged such that by referring to FIG. 14, the projected pieces (30) are formed in the upper rail (114) and the incised portions (32) are formed in the lower rail (112).

Further, while in the above described embodiments, the seat slide device (10) is provided on the right and left sides of the seat, it is not always necessary to provide the device (10) in such fashion, depending on the design of the seat.

The description above has just been given of preferred embodiments of the present invention, but it should be understood that the invention is not limited to the embodiments illustrated but various other replacements, modifications and additions may structurally be possible without departing from the scope and spirit of the appended claims for the invention.

Now, in accordance with the present invention, it will be appreciated that, when a sudden accident occurs, giving a high load of an occupant on the seat to his or her seat belt, an upward pulling force transmitted though the seat belt is exerted on the upper rail, tending to remove the upper rail from the lower rail, at which time, as the upper rail is raised due to the upward pulling force, the projected piece formed in one of the upper and lower rails is pressed against the incised portions formed in the other of those rails to bend the incised portions, thus causing mutual engagement of the upper and lower rails. Further, it will be observed that, as the upward pulling force continues to be exerted on the upper rail, the projected pieces are about to be deformed in a direction in which they are slipped out of the incised portions, but at the same time, the edges of the bent incised portions are instantaneously brought to strong abutment against the corresponding projected pieces to prevent the deformation of the projected pieces, and thus prevent the upper rail against its removal from the lower rail in a far more positive manner.

It is also important to note that the greater is exerted the upward pulling force upon the upper rail, the more strongly abutted are the incised portions against the projected pieces, and therefore, there is noproblem when a higher upward pulling force is applied thereto.

Moreover, in the present invention, a great rigidity is attained against a structural deformation from such simple combination of the projected pieces and bendable incised portions. Thus, the seat slide device per se can be formed of a thin steel plate without need for designing a great cross-section of the upper and lower rails, which makes it practical to produce a small-sized, weight-light seat slide device having a sufficient structural rigidity.

What is claimed is:

1. A seat slide device having an upper rail to be fixed to a floor of an automobile and a lower rail to be fixed to the side of a seat, said upper rail being slideably fitted to said lower rail, wherein a seat belt is provided on one of said seat or upper rail, said seat slide device comprising:

a plurality of easily bendable incised portions formed in said upper rail such that they are spaced apart from one another at a predetermined interval and until bent, said incised portions lying in the same plane as adjacent portions of said upper rail and forming a substantially unperforated surface with said adjacent portions; and a plurality of projected pieces formed in said lower rail, said projected pieces being so arranged that they are disposed at points corresponding to the respective said incised portions;

whereby, when an upward pulling force is exerted upon said upper rail, causing said upper rail to move upwards, said projected pieces of said lower rail are pressed against, and strongly gripped by engagement with said incised portions of said upper rail to bend said incised portions and pass therethrough, so as to effect a mutual engagement of said upper and lower rails, which prevents removal of said upper rail from said lower rail.

2. A seat slide device having an upper rail to be fixed to a floor of an automobile and a lower rail to be fixed to the side of a seat, said upper rail being slidably fitted to said lower rail, wherein the seat belt is proivided on one of said seat or upper rail, said seat slide device comprising;

a plurality of projected pieces formed in said upper rail such that they are spaced apart from one another at a predetermined interval; and a plurality of easily bendable insized portions formed in said lower rail, said insized portions being so arranged that they are disposed at points corresponding to the respective said projected pieces and until bent, said incised portions lying in the same plane as adjacent portions of said lower rail and forming a substantially unperforated surface with said adjacent portions;

whereby, when an upward pulling force is exerted upon said upper rail, causing said upper rail to move upwards, said projected pieces of said upper rail are pressed against, and strongly gripped by engagement with said incised portions of said lower rail to bend said incised portions and pass therethrough, so as to effect a mutual engagement of said upper and lower rails, which prevents removal of said upper rail from said lower rail.

3. The seat slide device according to claim 1, wherein each of said projected pieces is formed with a recess adapted to receive an edge of each of said incised portions, whereby, when said incised portions are pressed and bent by said projected pieces, said edge of the former is engaged into and received by said recess of the latter.

4. The seat slide device according to claim 1, wherein said lower rail is fitted to said upper rail in a manner enclosing said upper rail, and wherein said plurality of projected pieces are formed on both upper ends of said lower rail such that they are downwardly oriented in a direction facing towards the respective said plurality of incised portions.

5. The seat slide device according to claim 2, wherein said upper rail is fitted to said lower rail in a manner enclosing said lower rail, and wherein said plurality of projected pieces are formed on both lower ends of said upper rail such that they are upwardly oriented in a direction facing towards the respective said plurality of incised portions.

6. The seat slide device according to claim 1, wherein each of said incised portions is so formed that it comprises a connecting portion at one side and an incision at other remaining sides, said connecting portion being adapted to connect said incised portion with said upper rail.

7. The seat slide device according to claim 2, wherein each of said incised portions is so formed that it comprises a connecting portion at one side and an incision at other remaining sides, said connecting portion being adapted to connect said incised portion with said lower rail.

8. The seat slide device according to claim 1, wherein each of said incised portions is so formed as to be bendable with ease when said projected pieces are pressed thereagainst, and as to be brought to a strong abutment against the respective said projected pieces.

9. The seat slide device according to claim 2, wherein each of said incised portions is so formed as to be bendable with ease when said projected pieces are pressed thereagainst, and as to be brought to a strong abutment against the respective said projected pieces.

10. The seat slide device according to claim 1 wherein each of said incised portions is so formed that it has been slightly bent in advance.

11. The seat slide device according to claim 2 wherein each of said incised portions is so formed that it has been slightly bent in advance.

* * * * *